United States Patent
Romero Fernandez et al.

(10) Patent No.: US 8,079,762 B2
(45) Date of Patent: Dec. 20, 2011

(54) BEARING CAP AND METHOD FOR ITS FABRICATION

(76) Inventors: Antonio Romero Fernandez, Vilassar De Mar (ES); Brian Daniel Kaminski, Lake Orion, MI (US)

( * ) Notice: Subject to any disclaimer, the term of this patent is extended or adjusted under 35 U.S.C. 154(b) by 923 days.

(21) Appl. No.: 10/570,259

(22) PCT Filed: Aug. 27, 2004

(86) PCT No.: PCT/EP2004/009576
§ 371 (c)(1), (2), (4) Date: Feb. 16, 2007

(87) PCT Pub. No.: WO2005/021988
PCT Pub. Date: Mar. 10, 2005

(65) Prior Publication Data
US 2007/0183701 A1    Aug. 9, 2007

(30) Foreign Application Priority Data
Sep. 3, 2003  (ES) .................................. 200302064

(51) Int. Cl.
*F16C 33/14*    (2006.01)
(52) U.S. Cl. ............................ 384/429; 384/432; 419/27
(58) Field of Classification Search .................. 384/429, 384/430, 432, 434; 419/27
See application file for complete search history.

(56) References Cited

U.S. PATENT DOCUMENTS

| 2,669,491 A | | 2/1954 | Haller | |
|---|---|---|---|---|
| 5,666,637 A | * | 9/1997 | Fujiki et al. | 419/27 |
| 6,626,576 B1 | * | 9/2003 | Cadle et al. | 384/273 |

FOREIGN PATENT DOCUMENTS

| FR | 2 705 263 A1 | 11/1994 |
|---|---|---|
| WO | 00/46520 A1 | 8/2000 |
| WO | 02/075171 A1 | 9/2002 |

OTHER PUBLICATIONS

International Search Report for PCT/EP2004/009576, dated Dec. 3, 2004.

* cited by examiner

*Primary Examiner* — William C Joyce
(74) *Attorney, Agent, or Firm* — Sughrue Mion, PLLC

(57) ABSTRACT

Crankshaft bearing cap presenting on one of its faces a semi-cylindrical notch, formed by powder metallurgy with an iron powder blend molded by compaction and sintering, and partially infiltrated with Cu, being the area adjacent to the area around the notch, the one with highest Cu content. A method for manufacturing main bearing caps by infiltration of Cu including the steps of placing the molded cap so that the axis of the semi-cylindrical notch extends in a horizontal direction and the notch cavity is in the upwards position. Placing high Cu content tablets on the upper face of the cap and on the cylindrical arch and sintering of the cap and Cu tablets system.

7 Claims, 1 Drawing Sheet

BEARING CAP AND METHOD FOR ITS FABRICATION

Figure 1:
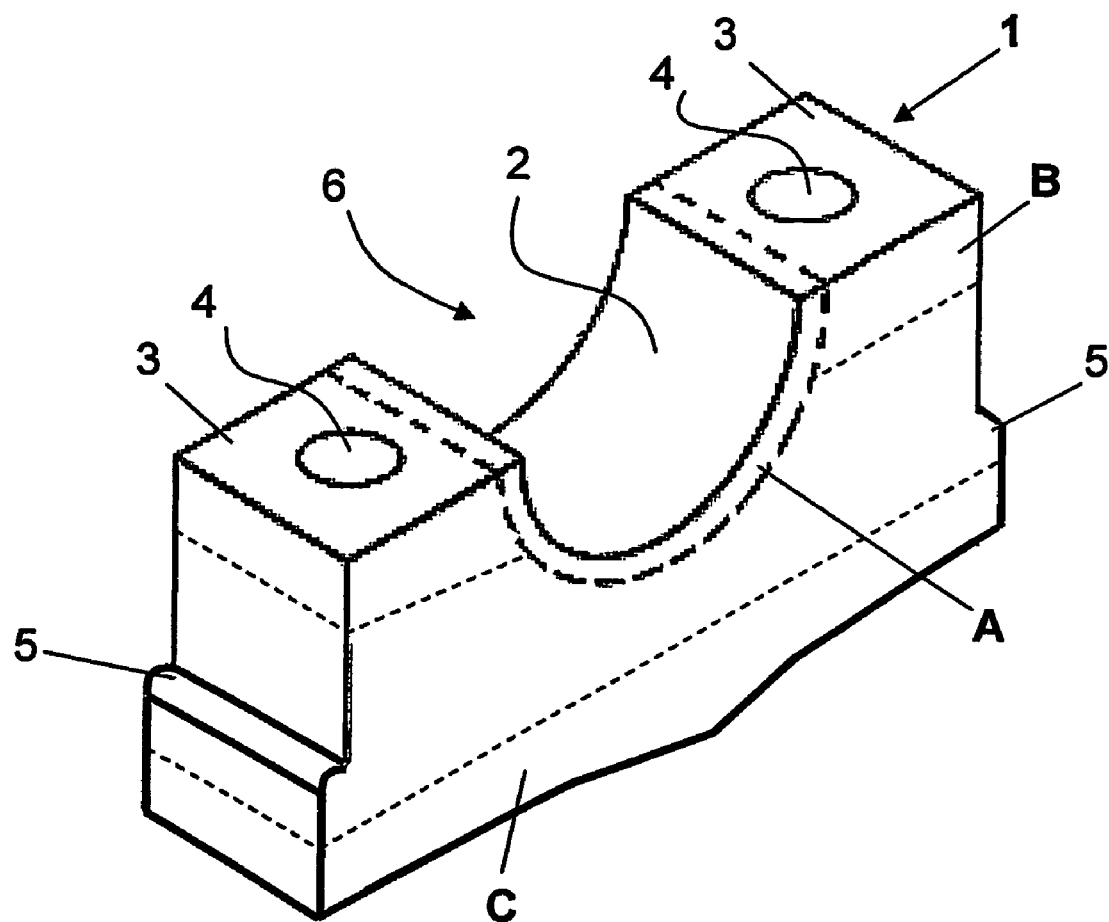

This application is a 371 of PCT Application No. PCT/EP2004/009576 filed Aug. 27, 2004; the disclosure of which is incorporated herein by reference.

TECHNICAL FIELD OF THE INVENTION

The invention refers to a crankshaft bearing cap presenting on one of its faces a semi-cylindrical notch. This cap is to be assembled on the engine block to form, along with an additional semi-cylindrical notch in the engine block, a cylindrical portion to house a bearing. The cap is formed by powder metallurgy with an iron powder blend molded by compaction and sintering.

BACKGROUND OF THE INVENTION

The technology for manufacturing high strength and high hardness parts by heating powder compacts from metal powders without reaching the melting temperature is known under the name of Powder Metallurgy.

Bearing caps manufactured by Powder Metallurgy are known. This manufacturing technique allows a cost reduction and at the same times a better control of dimensions than in the case of similar parts manufactured by casting. These caps have the disadvantage that, after being assembled on the engine block, they have to be machined. This involves several problems because of different material characteristics that exist between these caps and the material of which the engine block is formed.

Generally bearing caps have a semi-cylindrical notch on one of their faces and they are provided with through orifices allowing fastening them by means of bolts to the engine block, which is also provided with semi-cylindrical notches complementary to the cap notches. The caps assembled on the engine block determine a series of hollow cylindrical portions where the bearings that support the crankshaft are located.

Dimensions and position of said hollow cylindrical portions must be of very high precision since a good engine function and especially the running noise, depend in a large extend upon the size, precision and alignment of these cylindrical portions. Therefore it is frequent to machine the different cylindrical portions formed by the caps and the engine block when they are assembled.

Due to the need to stop the manufacturing process for changing the tooling used for boring or machining of the caps and engine block system, most recent investigations aim at improving the machinability of the bearing cap manufactured by Powder Metallurgy without affecting its strength.

The document WO 0046520 describes a bearing cap composed by two powder conglomerates from different metal powder blends located within the part according to their different mechanical characteristics and the functionality of each portion of the part or cap. Thus the powder blend in the area adjacent to the semi-cylindrical notch differs from the powder blend of the rest of the part. This one is a powder blend, which provides said area with better machining characteristics, more similar to those of the engine block.

Manufacturing of these caps requires a complicated powder filling systems on the tool for compaction of the part before being heated or sintered, making possible to fill the tool with different blends and locating them within the corresponding areas during the compacting operation. This double filling process, also called "dual filling" becomes very complex and makes the manufacturing process of the caps significantly more expensive.

On the other hand, as stated in the same document, infiltration processes providing better characteristics for machining show advantages for a different kinds of parts or products, but they are not considered for the purpose of bearing caps.

Thus it is noticed the lack of a bearing cap, which even improving the strength of the known bearings caps, allows the extension of the useful life of the cutting tools used for machining the system composed by the bearing caps and the engine block.

The invention refers to a crackshaft bearing cap and its method for manufacturing, that provides a innovative and effective solution to the problems described above, allowing the extension of the useful life of the cutting tools of its mechanization

SHORT DESCRIPTION OF THE DRAWING

The sole enclosed drawing shows a bearing cap as no limiting example.

DETAILED DESCRIPTION OF THE DRAWINGS

The bearing cap 1 has a main body with a generally parallelepiped shape, with flat front and rear faces, and an upper face provided with a semi-cylindrical notch 2, which limits two flat portions 3 at each end of the upper face at both sides of the notch 2, that flat portions being in contact with the engine block (not shown), to fix the limits, along with a semi-cylindrical notch on the engine block, of a cylindrical hollow portion for housing the bearing. Cap 1 it is provided with through holes 4, in each of the flat portions 3 allowing the passage of the corresponding screws, for fastening on the engine block. In addition, the cap may be provided with two lateral shoulders 5, which increase the part width in the opposite area to the semi-cylindrical notch 2.

The bearing cap 1 is composed by a powder conglomerate based on Fe molded by pressure and sintering and it is partially infiltrated with Cu by infiltration, the area A around notch 2 showing a higher Cu content.

Cu content is between 0.5 g and 0.8 g per cubic centimeter in the area A around notch 2. Area A shows a minimum thickness of 0.5 mm. This area will be machined later on for achieving a higher diameter accuracy and position of the cylindrical portion 6 that determines notch 2 with the additional notch in the engine block.

The presence of Cu in the area B, located below portions 3 is from 0 g to 0.8 g per cubic centimeter while in area C at a larger distance to notch 2 is from 0 g to 0.5 g. per cubic centimeter. Because of the different Cu contents in the part, machining of the cap turns out to be easier in some areas than in others. Area around notch 3 shows better characteristics for machining.

Since machining properties of area A are similar to those of the material the engine block is made of, the cutting tool does not find very different materials and strength when advancing. Thus, perturbations leading to a short tool life are prevented. There is neither the need to disrupt frequently the operation for replacing worn tools by new ones.

Example of Embodiment

A compaction tool with vertical configuration id filled with a blend composed of 2% weight of copper powder, 0.75% weight graphite powder and 0.7% weight of commercial wax "Acrawax" the balance being an atomized iron powder type.

Next the compacted part is sintered by applying the copper infiltration technique described below in a continuous sintering furnace. The parts are placed with the axis of notch 2 extending in a horizontal direction, with flat portions 3 and notch concavity in an upward position. Copper tablets obtained by compacting a commercial powder IP 174 from the company OMG are placed on these surfaces.

Sintering of the parts is carried out under an atmosphere composed by 5% mass of hydrogen, 0.5% mass of methane and the balance being nitrogen. Parts reach a temperature of 1.120° C., which is kept steady at least during a 15 minutes period. Next step is cooling the parts to room temperature in a chamber surrounded by a water cooled jacket, as it is common in continuous sintering furnaces.

Copper tablets' dimensions are 27×15×7.8 mm and they weigh 22 g. The compacted bearing caps weigh 920 g and the number of tablets placed on each cap or part is 3 or 4 units.

During sintering, copper tablets melt and liquid copper penetrates the porosity of the iron part leading to a partially infiltrated bearing cap. The material located near the flat basis and the cylindrical surface where the tablets are placed gets infiltrated with copper while the distant areas remain unchanged as when sintering without infiltration.

Parts infiltrated this way do not undergo any significant swelling. Therefore they do not need any later machining operation to adjust cap dimensions.

Thus the copper quantity in pores varies from a maximum in the area near the surface where the tablets are placed to a minimum on the opposite surface. Same variation is observed in the material hardness and consequently it may be concluded that the mechanical properties and machining are not the same on both bearing cap faces.

The invention claimed is:

1. A crankshaft bearing cap comprising:
   a semi-cylindrical notch;
   the crankshaft bearing cap configured to be assembled on an engine block to define the limits, along with a semi-cylindrical notch in an engine block, of a cylindrical portion for housing a bearing;
   the crankshaft bearing cap formed by a powder metallurgy process with an iron powder blend molded by compaction and sintering;
   wherein the crankshaft bearing cap is partially infiltrated with Cu in an area adjacent to the semi-cylindrical notch, the area adjacent to the semi-cylindrical notch having the highest Cu content of the crankshaft bearing cap;
   wherein the powder metallurgy process comprises:
      placing the crankshaft bearing cap so that an axis of the semi-cylindrical notch extends in a horizontal direction and the concavity of said notch faces upward;
      placing one or more tablets with a high Cu content on the upper face of the crankshaft bearing cap and on the semi-cylindrical notch; and
      sintering the crankshaft bearing cap and the one or more Cu tablets;
   wherein the one or more tablets with the high Cu content are obtained by compacting a powder blend with a copper content between 91 and 95% in weight.

2. The crankshaft bearing cap according to claim 1, wherein the infiltrated Cu content reaches 0.5 g to 0.8 g per cubic centimeter in the area adjacent to the semi-cylindrical notch wherein the area adjacent the notch has a minimum thickness of 0.5 mm.

3. A method for manufacturing a crankshaft bearing cap by infiltration of Cu and from a powder conglomerate based on Fe molded by compaction comprising the steps of:
   forming a bearing cap comprising a semi-cylindrical notch on a face of the bearing cap, wherein the bearing cap is configured to be assembled on the engine block to fix the limits, along with a semi cylindrical notch in an engine block, of a cylindrical portion for housing a bearing;
   wherein the crankshaft bearing cap is formed by a powder metallurgy process with an iron powder blend molded by compaction and sintering, wherein the crankshaft bearing cap is partially infiltrated with Cu in an area adjacent to the semi-circular notch, the area adjacent to the semi-circular notch having the highest Cu content of the crankshaft bearing cap;
   the method further comprising:
      placing the crankshaft bearing cap so that an axis of the semi-cylindrical notch extends in a horizontal direction and the concavity of said notch faces upward;
      placing one or more tablets with high a Cu content on the upper face of the crankshaft bearing cap and on the semi-cylindrical notch; and
      sintering the crankshaft bearing cap and the one or more Cu tablets;
   wherein the one or more tablets with the high Cu content are obtained by compacting a powder blend with a copper content between 91 and 95% in weight.

4. A method for forming a crankshaft bearing cap, the method comprising:
   forming an intermediary part by compacting and sintering an iron powder blend such that the intermediary part comprises a semi-circular notch;
   placing the intermediary part such that the concavity of the semi-circular notch faces upward;
   placing one or more tablets, which were formed by compacting a powder blend comprising a Cu content between 91% and 95% in weight, on the semi-circular notch of the intermediary part;
   sintering the intermediary part and the one or more tablets such that the Cu partially infiltrates the area adjacent to the semi-circular notch, thereby forming the crankshaft bearing cap.

5. The method for forming a crankshaft bearing cap according to claim 4, further comprising:
   machining the area adjacent to the semicircular notch with the partially infiltrated copper.

6. The method for forming a crankshaft bearing cap according to claim 4, further wherein the infiltrated Cu content reaches 0.5 g to 0.8 g per cubic centimeter in the area adjacent to the semi-cylindrical notch.

7. The method for forming a crankshaft bearing cap according to claim 6, wherein the area adjacent the notch has a minimum thickness of 0.5 mm.

* * * * *